United States Patent
Koskela et al.

(10) Patent No.: US 10,972,152 B2
(45) Date of Patent: Apr. 6, 2021

(54) BEAM-BASED RADIO LINK MONITORING (71) Applicant: Nokia Technologies Oy, Espoo (FI)

(72) Inventors: Timo Koskela, Oulu (FI); Esa Malkamäki, Espoo (FI); Samuli Turtinen, Ii (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/496,024

(22) PCT Filed: Mar. 1, 2018

(86) PCT No.: PCT/FI2018/050150
§ 371 (c)(1),
(2) Date: Sep. 20, 2019

(87) PCT Pub. No.: WO2018/172604
PCT Pub. Date: Sep. 27, 2018

(65) Prior Publication Data
US 2020/0028545 A1 Jan. 23, 2020

Related U.S. Application Data (60) Provisional application No. 62/476,116, filed on Mar. 24, 2017.

(51) Int. Cl.
*H04B 7/02* (2018.01)
*H04B 7/0408* (2017.01)
*H04B 17/309* (2015.01)

(52) U.S. Cl.
CPC ......... *H04B 7/0408* (2013.01); *H04B 17/309* (2015.01)

(58) Field of Classification Search
CPC .......... H04B 7/02; H04B 7/04; H04B 7/0404; H04B 7/0408; H04B 7/0413; H04B 7/0417; H04B 7/08; H04B 17/20; H04B 17/23; H04B 17/24; H04B 17/29; H04B 17/30; H04B 17/309
See application file for complete search history.

(56) References Cited

U.S. PATENT DOCUMENTS 10,422,839 B2 * 9/2019 Hassan ............ G01R 33/34046
10,454,755 B2 * 10/2019 Wilson .................. H04B 7/0695
2015/0071056 A1 3/2015 Yi et al.
(Continued)

OTHER PUBLICATIONS

3GPP TSG-RAN WG2#97, R2-1701801, Dated Feb. 13-17, 2017.*
(Continued)

*Primary Examiner* — Siu M Lee
(74) *Attorney, Agent, or Firm* — Brake Hughes Bellermann LLP (57) ABSTRACT A method including monitoring, by a user equipment (UE) operating in a multi-beam based communication session, signal qualities for a plurality of beams in the multi-beam based communication session (300); determining a beam link failure (BLF) occurring for at least one of the beams in the multi-beam based communication session (302); determining a type of the beam in which the beam link failure (BLF) is occurring (304); and updating a radio link failure (RLF) related condition in dependence on the type of the beam in which the beam link failure (BLF) is occurring (306).

18 Claims, 7 Drawing Sheets

(56) References Cited

U.S. PATENT DOCUMENTS

| | | | |
|---|---|---|---|
| 2016/0353510 A1* | 12/2016 | Zhang | H04L 43/16 |
| 2018/0249394 A1* | 8/2018 | Nilsson | H04W 36/0055 |
| 2020/0015228 A1* | 1/2020 | Kang | H04W 16/28 |
| 2020/0076556 A1* | 3/2020 | Takahashi | H04L 5/0053 |
| 2020/0099437 A1* | 3/2020 | Harada | H04B 17/318 |

OTHER PUBLICATIONS

"3rd Generation Partnership Project; Technical Specification Group Radio Access Network; Evolved Universal Terrestrial Radio Access (E-UTRA); Physical layer procedures (Release 14)", 3GPP TS 36.213, V14.1.0, Dec. 2016, pp. 1-414.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 14)", 3GPP TS 36.300, V14.1.0, Dec. 2016, pp. 1-317.

"RLF for NR", 3GPP TSG-RAN WG2#97, R2-1701801, Agenda Item: 10.3.1.1.5, Huawei, Feb. 13-17, 2017, 4 pages.

International Search Report and Written Opinion received for corresponding Patent Cooperation Treaty Application No. PCT/FI2018/050150, dated Jun. 7, 2018, 15 pages.

"Recovery Mechanisms for Beam Failure Scenarios", 3GPP TSG RAN WG1 Meeting #88, R1-1702938, Agenda item : 8.1.2.2.2, Samsung, Feb. 13-17, 2017, 3 pages.

"Discussion on Radio Link Monitoring in NR", 3GPP TSG RAN WG1 Meeting NR#3, R1-1715848, Agenda Item : 6.1.5.2, LG Electronics, Sep. 18-21, 2017, 8 pages.

"Beam Recovery Procedure", 3GPP TSG-RAN WG2 Meeting #97bis, R2-1703561, Agenda item : 10.2.3.4, Qualcomm Incorporated, Apr. 3-7, 2017, pp. 1-4.

Extended European Search Report for European Application No. 18772524.7, dated Nov. 18, 2020, 12 pages.

3GPP TSG RAN WG2 Meeting #95, R2-164899; "RLM and RLF in HF NR"; Gothenburg, Sweden; Aug. 22-26, 2016; 4 pages.

3GPP TSG RAN WG2#97, R2-1701730; "Beam recovery"; Athens, Greece; Feb. 13-17, 2017; 2 pages.

3GPP TSG-RAN WG2 Meeting #97, R2-1701358 (Resubmission of R2-1700403); "Radio Link Failure operation in High Frequency NR systems"; Athens, Greece; Feb. 13-17, 2017; 3 pages.

* cited by examiner

BEAM-BASED RADIO LINK MONITORING

RELATED APPLICATION

This application was originally filed as a Patent Cooperation Treaty Application No. PCT/FI2018/050150 filed on Mar. 1, 2018, claiming priority from a U.S. Provisional application No. 62/476,116 filed on Mar. 24, 2017.

BACKGROUND

Technical Field

The exemplary and non-limiting embodiments relate generally to radio link monitoring (RLM) and, more particularly, to radio link failure (RLF).

Brief Description of Prior Developments

Radio link monitoring (RLM) in Long-Term-Evolution (LTE) is a known procedure for ensuring that link quality degradation is detected at user equipment (UE) and appropriate actions are taken. Conventionally a user equipment (UE) Radio Resource Control (RRC) maintains counters and timers for the purpose of RLM. The RRC, upon receiving a sufficient amount of consecutive out-of-sync (OOS) indications from Level 1 (L1), starts one of the timers. While that timer is running no specific actions are taken by the RRC and the RRC waits for the L1 to indicate a potential recovery by indicating an in-sync (IS) indication. If the RRC receives a sufficient amount of consecutive IS indications from the L1 and the timer is running, the timer is stopped and no RLF occurs. Otherwise, if the case L1 does not indicate consecutive IS indications before the timer expires, the UE RRC declares RLF and initiates RRC level recovery to re-establish the RRC connection.

Fifth generation mobile networks or fifth generation wireless systems (5G) are the proposed next telecommunications standards beyond the current 4G/IMT-Advanced standards. 5G are proposed to operate with multiple beams (with beamforming and tracking techniques). That may mean that the UE is receiving and/or transmitting data with multiple beams during a communication session with the network.

SUMMARY

The following summary is merely intended to be exemplary. The summary is not intended to limit the scope of the claims.

In accordance with one aspect, an example method comprises monitoring, by a user equipment (UE) operating in a multi-beam based communication session, signal qualities for a plurality of beams in the multi-beam based communication session; determining a beam link failure (BLF) occurring for a beam at least one of the beams in the multi-beam based communication session; determining a type of the beam in which the beam link failure (BLF) is occurring; and updating a radio link failure (RLF) related condition in dependence on the type of the beam in which the radio beam link failure (BLF) is occurring. In accordance with another aspect, an example apparatus comprises at least one processor; and at least one non-transitory memory including computer program code, the at least one memory and the computer program code configured to, with the at least one processor, cause the apparatus to: monitor by the apparatus, operating, in a multi-beam based communication session, a signal qualities for a respective beam plurality of beams in the multi-beam based communication session; determine a radio beam link failure (BLF) occurring for the beam at least one of the beams in the multi-beam based communication session; determine a type of the beam in which the radio beam link failure (BLF) is occurring; and update a radio link failure (RLF) related radio resource control (RRC) timer condition in dependence on the type of the beam in which the radio beam link failure (BLF) is occurring.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
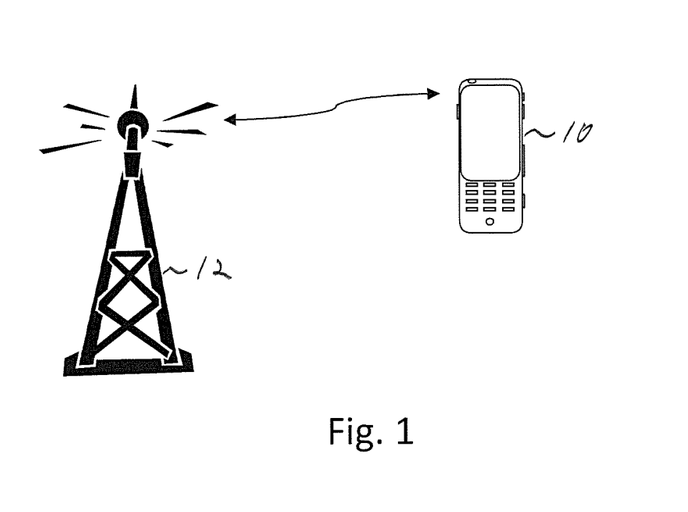
FIG. 1 is a diagram illustrating some components in a wireless communication system.

The following abbreviations that may be found in the specification and/or the drawing figures are defined as follows:

ACK Acknowledgement
BRS Beam Reference Signal
CE Control Element
CRS Cell-specific Reference Signal
DL Downlink
gNB 5G Node-B
IS In Sync
LTE Long Term Evolution
MAC Medium Access Control
MIB Master Information Block
NACK Negative acknowledgement
OOS Out of Sync
PBCH Physical Broadcast Channel
PCell Primary Cell
PDCCH Physical Downlink Control Channel
PDSCH Physical Downlink Shared Channel
PSS Primary SS
PUCCH Physical Uplink Control Channel PUSCH Physical Uplink Shared Channel
RACH Random Access Channel
RLF Radio Link Failure
RLM Radio Link Monitoring
RRC Radio Resource Control
RSRP Reference Signal Received Power
SR Scheduling Request
SRS Sounding Reference Signal
SS Synchronisation Signal
SSS Secondary SS
TRP Transmission Reception Point
TSS Tertiary SS
UE User Equipment
UL Uplink Referring to FIG. 1, a view is shown of a user equipment 10 incorporating features of an example embodiment and a base station 12. Although the features will be described with reference to the example embodiments shown in the drawings, it should be understood that features can be embodied in many alternate forms of embodiments. In addition, any suitable size, shape or type of elements or materials could be used.

Figure 1A:
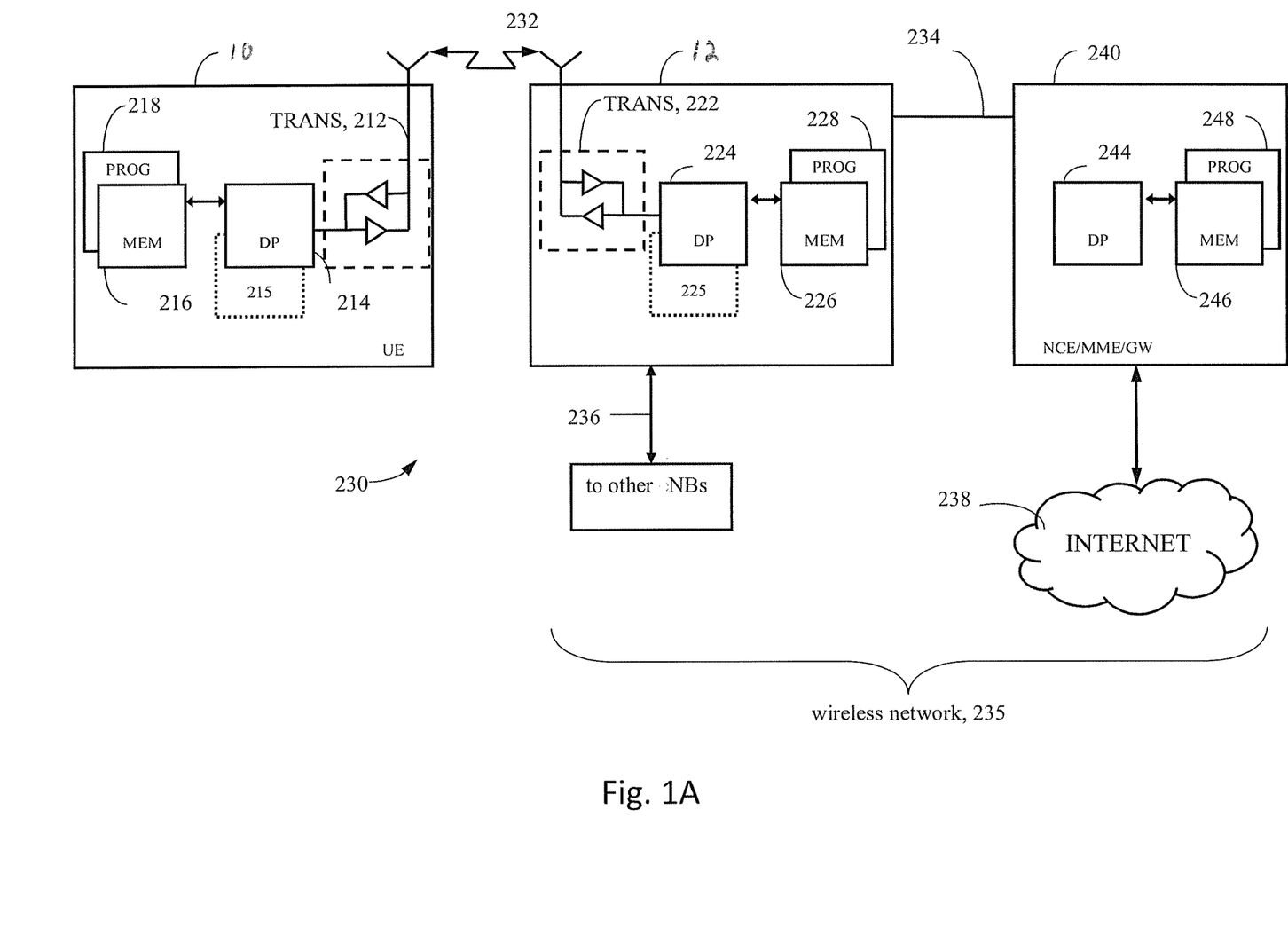
FIG. 1A is a diagram illustrating further details of example components in the wireless communication system shown in FIG. 1.

Referring to FIG. 1A, a wireless communication system 230 may comprise communication stations, such as the base station 12 for example, which form cells to which the user equipment (UE) 10 may connect. Some of the cells overlap one another to provide service for UE 10 moving across the cells. The UE 10 may move in and out of the various cells as the UE 10 travels. In the wireless system 230 a wireless network 235 is adapted for communication over a wireless link 232 with an apparatus, such as a mobile communication device which may be referred to as a UE 10, via a network access node, such as a Node B or an evolved node B (eNB) or 5G node B (gNB) for example. The access nodes may be called also base stations. A further example of a base station/access node 12 may be a gNB for example. The network 235 may include a network control element (NCE) 240 that may include MME/S GW functionality, and which provides connectivity with a network, such as a telephone network and/or a data communications network (e.g., the internet 238).

The UE 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the gNB 12 via one or more antennas.

The gNB 12 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The gNB 12 is coupled via a data/control path 234 to the NCE 240. The path 234 may be implemented as an interface. The gNB 12 may also be coupled to another gNB via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the gNB 12; and/or by the DP 244 of the NCE 240, or by hardware, or by a combination of software and hardware (and firmware).

In an example embodiment at least some of the functionalities of the apparatuses 12 and 240 may be shared between two or more physically separate devices forming one operational entity. Therefore, the apparatus may be seen to depict the operational entity comprising one or more physically separate devices for executing at least some of the described processes. The apparatus utilizing such shared architecture, may comprise a remote control unit (RCU), such as a host computer or a server computer, operatively coupled (such as via a wireless or wired network for example) to a remote radio head (RRH) located in the base station. In an example embodiment, at least some of the described processes may be performed by the RCU. In an example embodiment, the execution of at least some of the described processes may be shared among the RRH and the RCU. In an example embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of net-works, into the server computer or the host computer (i.e. to the RCU). External network virtualization may be targeted to optimized network sharing. Another category is internal virtual networking which provides network-like functionality to the software containers on a single system. Virtual networking may also be used for testing the terminal device. In an example embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

For the purposes of describing various exemplary embodiments in accordance with this invention the UE 10 and the gNB 12 may also include dedicated processors, for example RRC module 215 and a corresponding RRC module 225. RRC module 215 and RRC module 225 may be constructed so as to operate in accordance with various exemplary embodiments in accordance with this invention.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Figure 2:
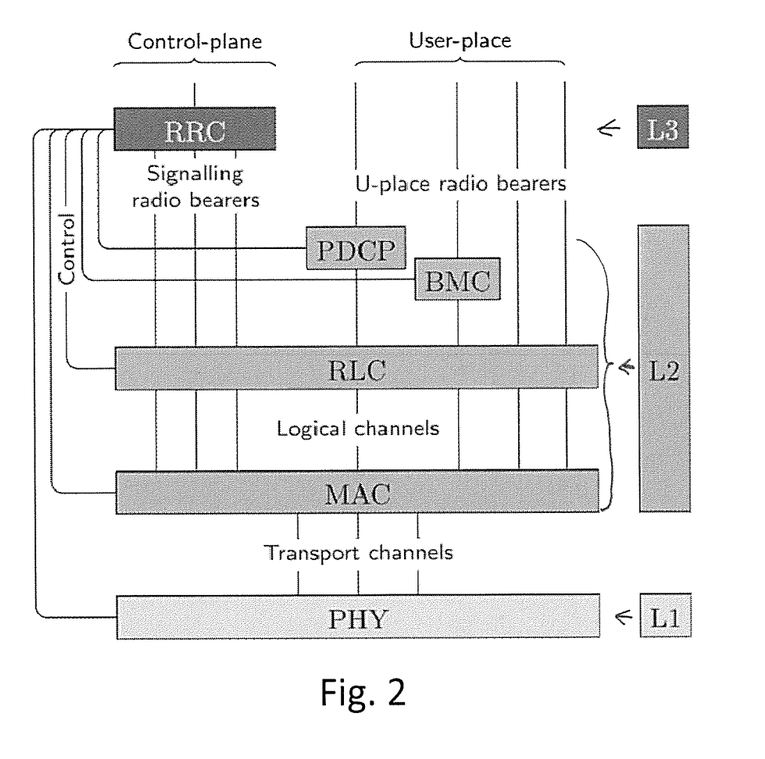
FIG. 2 is a diagram illustrating various different levels L1, L2 and L3 in Protocol Architecture around Physical Layer (PHY)

Referring also to FIG. 2, a diagram is shown which illustrates various different levels L1, L2 and L3 in Protocol Architecture around Physical Layer (PHY). This diagram helps to understand the description below.

In a multibeam system, such as in New Radio (NR) or 5G for example, a cell may be covered using multiple narrow beams (narrow compared with the sector beams such as used in 4G for example). When considering LTE baseline for radio link monitoring in the multibeam system the concept of providing In-Sync/Out-of-Sync (IS/OOS) indications between protocol layers can be illustrated as below. Instead of a single Cell specific Reference signal (CRS) for monitoring, as used in 4G for example, there may be multiple beam specific reference signals (or alternatively synchronization signal (SS) block specific signals such as new radio (NR) SSS/PSS/TSS) that are considered for radio link monitoring. Example reference signals may be (but not limited to) CSI-RS, cell specific CSI-RS, PBCH DMRS, PDCCH/PDSCH DMRS, Mobility Reference Signals, Beam reference signals or the like. Furthermore the CSI-RS signals may be beam and cell specific, or configured to be UE specific. Different cells may transmit CSI-RS in coordinated manner. Alternatively multiple TRPs/Antenna panels may be used to transmit same or different CSI-RS. In some example embodiments example signals may be uplink signals such as PUSCH DMRS, SRS (sounding reference signals), Reference signal for UL signal based mobility, SR (scheduling request), RACH preamble or the like.

Figure 3:
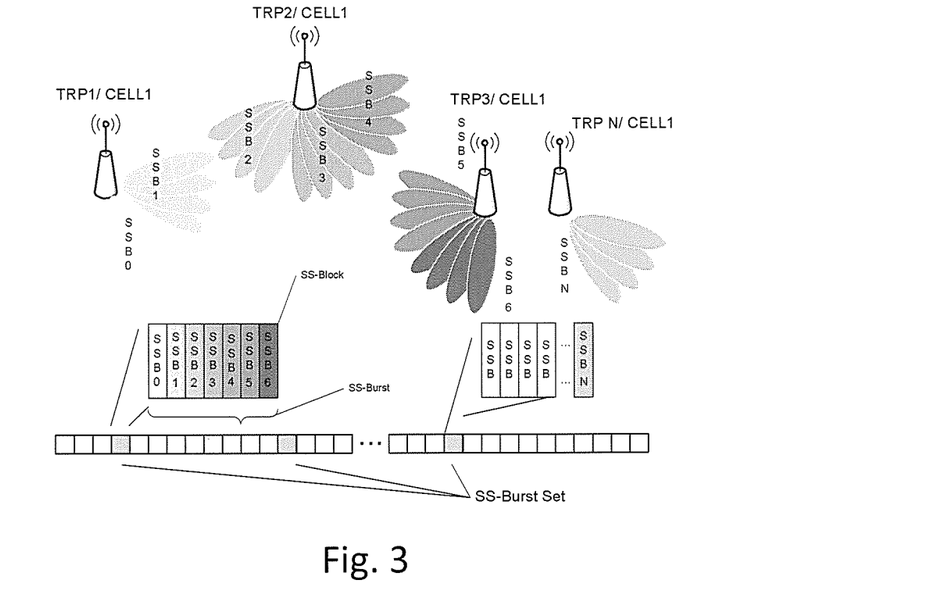
FIG. 3 is a diagram illustrating SS-blocks, SS-bursts and SS-Burst sets in a multibeam system.

Referring to FIG. 3, a Synchronization Signal (SS) burst set may be introduced to provide coverage for common control channel signaling with beam forming. This may be used to cover a cell in higher frequencies where multiple beams are needed. Only a subset of beams may be active at the same time due to cost and complexity. Subset of beams may be transmitted from different TRPs of a cell. A cell may be swept in time domain using different subset of beams.

For an SS-block, a set of signals/channels may be transmitted in a block such as NR-SS, beam reference signal (BRS) and/or physical broadcast channel (PBCH). In each SS-block different set of beams may be active. NR-SS may be transmitted using all the beams in a SS-block. Per SS-block the primary synchronization signal (PSS) and secondary synchronization signal (SSS) signals may have same values (to indicate physical cell ID (PCI)) and different SS blocks may be differentiated by using explicit index signal such as, for example, TSS (tertiary synchronization signals) or SSS value space may be divided between block index and physical cell ID, or signaled in PBCH in master information block (MIB). Beam RS signals (or any beam specific reference signals such as Mobility Reference Signal (MRS), channel state information (CSI)-RS for example) are beam specific and may be used to identify different beams in an SS-block. Thus there may be correspondence between beams used to transmit SS block and the individual beams of an SS block identified by CSI-RS.

For SS-burst, a set of SS-blocks are transmitted during an SS-burst. SS burst may be, for example, one sub frame/slot.

For SS-burst set, a set of SS-bursts may define the periodicity of an SS-block, such as 5 ms, 10 ms, 20 ms, 40 ms, etc. for example, depending on the required number of SS-blocks needed to cover a cell.

Figure 4A:
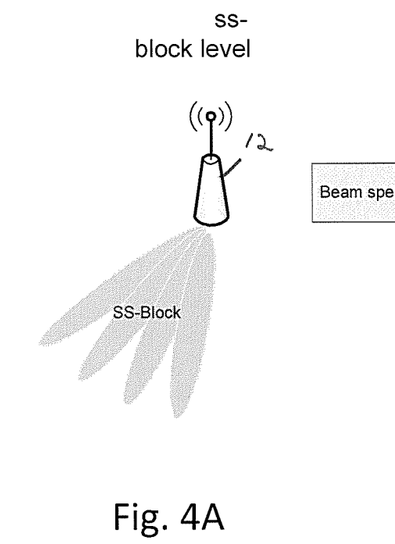
FIG. 4A is a diagram illustrating an SS-block transmitted using multiple analogue beams.
Figure 4B:
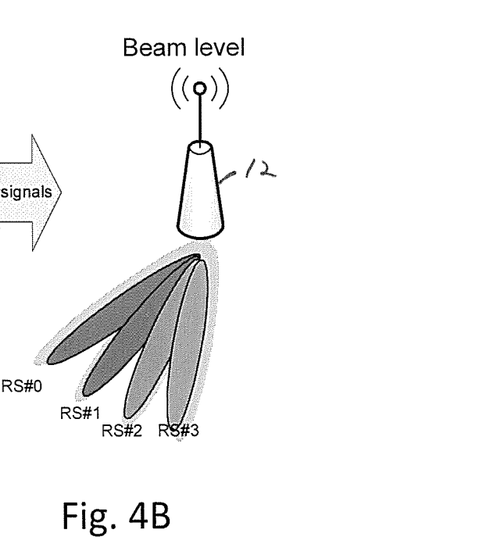
FIG. 4B is a diagram illustrating use of beam specific reference signals to identify different beams in an SS-block.

As illustrated in FIG. 4A a SS-block may be transmitted using multiple analogue (or digital) beams or a single wide beam. From UE perspective, the transmitted signals in SS-block are seen as single beam transmission. Beams of an SS block may also be transmitted from different TRPs (transmit receive points). The UE would not be able to differentiate the used (analogue) beams as same signal is transmitted on all the beams of an SS block. To identify different beams in an SS-block, a beam specific reference signals may be used as shown in FIG. 4B. Please note that this figure merely illustrates a single TRP (or a cell). However, multiple TRPs of a cell may each transmit the same signal (SS block). Beam specific reference signals/ports may correspond the beams used for transmitting the SS block. The beam specific reference signals/ports may be cell specific e.g. same for all UEs or non-cell specific e.g. configured for one or more UEs. In some cases the beam reference signals are transmitted together with the SS block (in FDM manner, for example UE may be able to detect SS block but also individual beams), in some example cases the beam reference signals may be transmitted at different time instance, but the beams may correspond to the beams used for transmitting the SS block. Thus, SS block may indicate the ports/CSI-RS indices that correspond with the SS block. The ports/CSI-RS corresponding the SS block may be signaled, such as in MIB/SIB for example. The same signals/ports may be reused per SS-block and different SS blocks can be detected based on the SS block ID (or a time index). When combining the RS/port indices together with the SS-block identifier, the UE is able to determine logical beam indices so that each beam transmitted in a cell has a unique identifier. This beam ID or index can be used to refer to a specific downlink beam by an index. Alternatively each beam of a cell may have unique RS/port.

Figure 5:
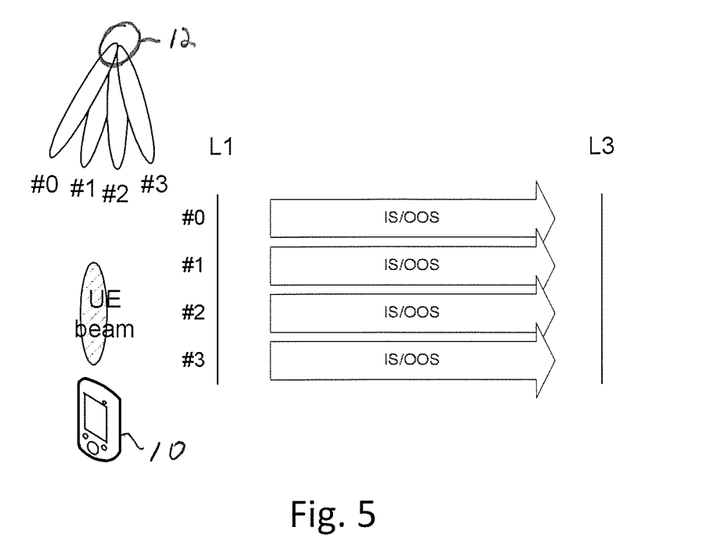
FIG. 5 is a diagram illustrating a multibeam RLM based on per beam IS/OOS.
Figure 6:
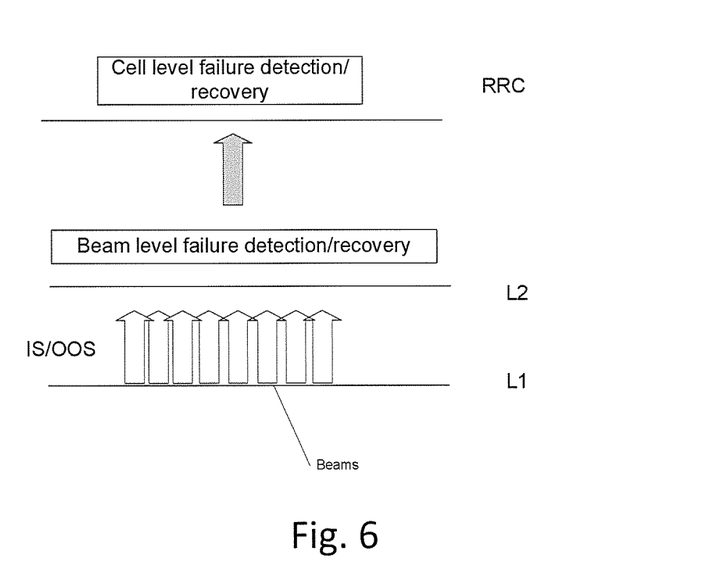
FIG. 6 is a diagram illustrating layer mapper of different levels of recovery.

To manage beam recovery and cell level recovery efficiently, a new framework for RLM is provided for beam based systems. FIG. 5 illustrates a multibeam RLM based on per beam IS/OOS. As L2 should be responsible for beam recovery, it may not be beneficial for RRC to manage beam level recovery: RRC is typically operating on cell level. FIG. 6 illustrates the layer mapping of different levels of recovery. RLM is done by the UE, but in case of separate UL/DL beams a base station may indicate to the UE to recover uplink.

With features as described herein, beam-specific Link Failure or Link failure counting may be used so that each beam is tracked separately at L2, and the L2 can indicate to upper layers (potential) beam failure on a given configured resources (for example a cell or a beam or a beam group). The counting referred herein may refer to the counting of beam specific OOS/IS indications received from L1 on beams configured for radio link monitoring. Such beams may be, for example explicitly configured by gNB/serving cell for RLM purpose, or the beams may be beams used for PDCCH reception or beams corresponding to the transmitted PDCCH beams from gNB (for example, a beam may not be directly used for PDCCH reception, but can be used to calculate IS/OOS condition based on indicated offset that indicates the beamforming gain difference, as will be described later). In one example there may be threshold values for how many consecutive OOS indications are required to declare beam link failure (at which point L2 may send an indication/command to L3) and similar manner may be determined that how many consecutive IS indications are needed to consider beam to be in 'in-sync' condition (such as, for example, the beam link failure is recovered). Upon receiving the indication from L2, the RRC at L3 may determine whether to declare a cell-level RLF and possibly a RRC connection re-establishment or indicate radio link problem. This may depend on the nature of the indication (such as, for example, PDCCH beams fail and no alternative beams are detected or PDCCH beam or all PDCCH beams fail or UL beam fails). RLF (Radio Link Failure) is determined at cell level (i.e. RRC). Detection of RLF starts by detection of a cell radio link problem which may be indicated by lower layers by indicating cell level radio link problem by IS/OOS or direct indication. If a cell is not recovered before a specific timer expires (such as a T310 timer in LTE for example) UE declares cell level RLF and initiates cell level recovery actions.

Each beam may have its specific respective counter at L2. The counters may detect and keep count of the beam specific IS/OOS indications received from the physical layer (L1) based on beam quality. The RRC timers may be affected by L2 directly with a START command, a STOP command and an EXPIRE command (that start/stop/expire the corresponding timer (for example a T310 timer or other timer(s)) which may be started when radio link problem is detected, based OOS indications for example) based on the beam level counters/indications which are part of L2 RLM functions. Therefore, these commands may be used by L2 to update the timer condition to be one of running, not-running and expired. L2 may also expire a timer that is already running by the explicit command such as, for example, when the RRC receives EXPIRE it may immediately declare the timer to be expired regardless of the value of the running timer. One way to implement EXPIRE could also be to configure timer (e.g. T310 timer) with value 0 ms and re-start it (so it would expire immediately).

Beams with DL and UL may be more important than DL-only beams and may be evaluated separately by L2 RLM function. The beams may also be considered to be part of a group of beams so that only one of the beams in the group is evaluated for RLM. In one example there may be multiple DL only beams and only one is OOS. In that example the cell may not be considered OOS. However, in another example, if a beam with DL/UL is out of sync then UE has lost uplink and recovery is needed, and in such case L3 may need to be informed so that it may trigger recovery process for the uplink. The UE may be configured with separate downlink (e.g. PDCCH, PDSCH) and uplink (e.g. PUCCH, PUSCH) beams. The UE may be configured with separate downlink-only beams (such as beam with only PDCCH for example), beams with both downlink (such as PDCCH, PDSCH for example) and uplink (such as PUCCH, PUSCH for example), or beams with only uplink (such as PUCCH, PUSCH for example). The UL beam IS/OOS conditions may be evaluated based on configured DL beam (in a reciprocity case it may the corresponding DL beam).

IS condition means that the corresponding beam is at a sufficient quality level (such as above a quality threshold for example) while OOS condition means that beam quality is not sufficient (such as below a quality threshold for example, which may or may not be the same threshold as for the IS condition). In a case of non-reciprocity (where downlink beams do not correspond with uplink beams, the gNB may indicate to the UE to do an UL beam recovery in case it does not receive any UL from the UE. Similarly in reciprocity case (where DL beam corresponds with UL beam) but UE is configured a beam for UL only, gNB may indicate UE to do UL recovery. This indication may be done using MAC CE/PDCCH command (indicated in DCI, Downlink Control Information) for example.

Even though the application is written such that the beam specific IS/OOS indications are monitored at the L2 layer by the help of the counters employed at the L2 layer, and the timers are employed on the higher RRC layer (L3), the implementation may vary in different design options. In alternative implementation options L1 may indicate cell level IS/OOS to L3 and indicate beam level IS/OOS to L2. L2 and L3 may operate in parallel: L3(RRC) may start cell level recovery timer (such as T310) while L2 tries to recover the link/beam failure based on L1 indication. In L2 recovery, if the RLM is done on PDCCH beams it may mean to obtain new PDCCH beam. In yet another implementation option L1 may provide same beam level indications to L2 and L3 and both layer operate at their respective way based on the indications; L2 tries recover the beam failure and L3 starts timer to wait for recovery or performs other actions such as cell reselection. Also in yet another implementation options the L3 operates on cell level IS/OOS counters that work on based on the L1/L2 indication and L2 does not directly manage the RRC timer (e.g. T310) but indicates cell level IS/OOS and L3 cell level counters. In one further option although L2 does not manage the timer START/STOP it may indicate it to EXPIRE early based on the beam IS/OOS conditions. Please note that these are merely examples and should not be considered as limiting.

DL Portion Radio Link Monitoring Framework for a Beam Based System

Figure 7:
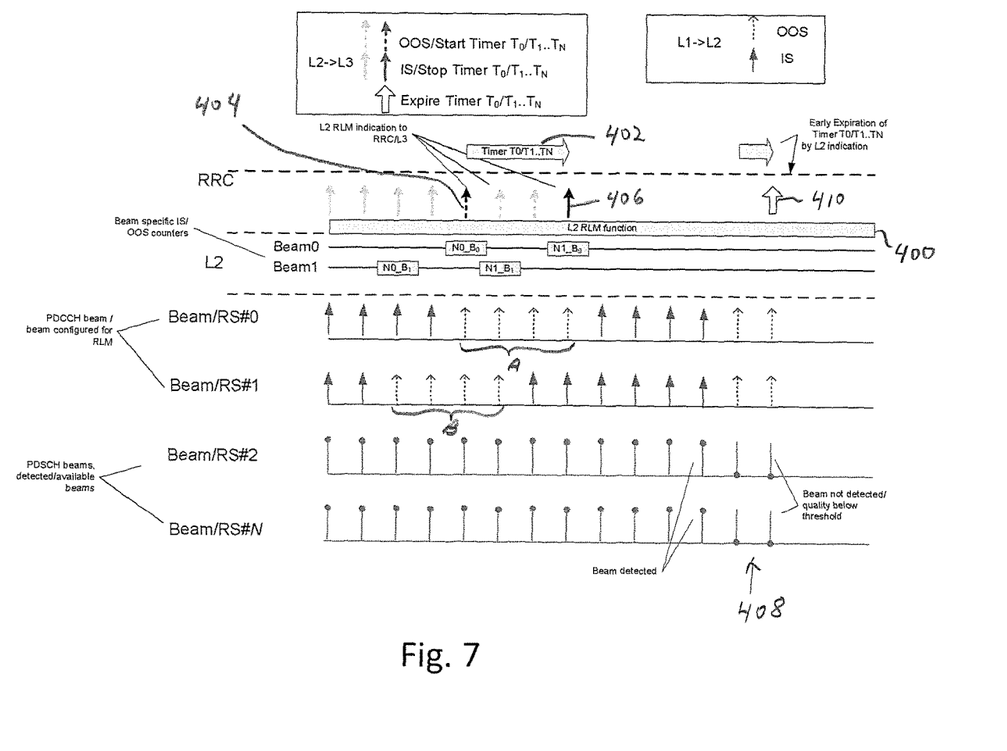
FIG. 7 is a diagram illustrating RLM framework for a multibeam system comprising some of the features as described herein.

FIG. 7 illustrates a RLM framework for a multibeam system. Example Beams RS #0 through RS #N are illustrated for level 1 (L1) where N may be any whole number. In this example Beam/RS #0 and Beam/RS #1 are PDCCH beams configured for RLM, and Beam/RS #2 and Beam/RS #N are PDSCH beams detected/available. As shown in this example, RS #1 experiences OOS at A and RS #) experiences OOS at B. Note the overlap of A and B. At L2 the beam specific counters Beam1 and Beam0 are able to count and determine beginnings and endings of OOS problems as indicated by N0_B1–N1_B1 and N0_B0–N1_B0 respectively. Based at least partially on this information, the L2 RLM function 400 may interact with the RRC (L3) by means of L2 RLM indications to signal start of a timer 402 as indicated by 404 and stop of the timer 402 as indicated by 406. In this example, the STOP indication 406 is given after receiving two in-sync indications for beam1 from L1, although beam0 is still out-of-sync at that point. In addition, as indicated at 408, there may be an early expiration of the timer when beams are not detected or the beams are below a threshold, where the expire signal 410 is sent by L2 to L3. Here it needs to be noted that the expiry command 410 is due to the UE having zero DL beams available. That is the PDCCH beams 0 and 1 and PDSCH beams 2 . . . N are all out-of-sync/not detected. At point 404, EXPIRY signal was not triggered because the UE still had at least one of the PDSCH beams 2 . . . N/or alternative beams are detected to attempt beam recovery (obtain new beam for PDCCH reception). Timer T0, T1, . . . TN is to represent that there may be different timers on L3 that may be controlled by L2 indication (e.g. T310).

L1 may provide indication of radio link quality according to configured radio link quality per beam basis. There may be configured quality thresholds set by the network and/or based on pre-determined configuration. In one embodiment, the IS/OSS condition may be determined by L1 per beam for beams configured for PDCCH reception. Beam link failure condition/status determination by L2 may be based on detecting a certain number of OOS indications/conditions from L1, whereas the beam link failure may be considered to be recovered when L2 detects a certain amount of IS indications/conditions from L1. The IS/OSS counters may be beam specific. In an alternate example, one counter per cell is maintained at L2. Whether the beam specific IS/OOS indication is counted may be determined by L2 RLM function.

A L2 RLM function at L2 may process beam level IS/OOS indications from L1 and may send instructions to RRC layer (L3) to handle counters.

A L2 RLM function may indicate to a higher layer (L3) to START, STOP or EXPIRE cell-specific timers (RLM/RLF related) based on the predefined conditions determined from the beam level IS/OOS indications.

One example would be to trigger START for a T310 timer, in order to indicate an RRC-level radio link problem and RRC re-establishment at the expiry of the started timer T310.

In one example, in case T310 is not running and L2 indicates "EXPIRE", it triggers RRC level recovery procedure (L2 can indicate EXPIRE without T310 running) As an example L2 may indicate EXPIRE when PDCCH beams or beams configured for RLM are considered OOS and no alternative beams are detected in a cell for recovery, as shown in FIG. 7 with reference numeral 410. Early expiration may trigger RRC to re-establish connection to other cell to recover the radio link (cell level) sooner than waiting the timer to expire.

In one example, in case T310 is running and L2 indicates "EXPIRE", RRC may deem the timer as expired, which may trigger RRC to declare RLF and corresponding RRC level recovery procedures In one type of alternate example, L2 may indicate IS/OOS condition to RRC that runs cell level counters so that the RRC may determine to start/stop the timer. In this example, L2 may indicate only when to EXPIRE early. By early it is meant earlier than the timer T310 would otherwise expire.

In one example embodiment the L2 RLM function may perform the following actions:

In case there is at least one physical downlink control channel (PDCCH) beam in IS condition, L2 does not indicate RRC level RLF timer start, as shown in FIG. 7 (when beam 1 is OOS but beam 0 is still available, no start command is sent).

In case a PDCCH beam is OOS and even if there are other non-PDCCH beams in a cell available, L2 may indicate START (or cell level OOS) to RRC and initiate beam recovery procedure to find a suitable PDCCH beam. Initiating beam recovery may happen after receiving a first OOS from a PDCCH (assuming that it is only PDCCH beam), or only after receiving N (N310) OOS indications, but the beam recovery at L2 may start at the same time as RRC is informed, such as T310 may start when UE initiates beam recovery at L2 for example. Based on L2 to L3 IS/OOS indication or direct indication (such as "START" for example) by L2. Starting T310 timer at L3 when the beam recovery is started at L2 may be seen as a kind of a "fall back", in case the beam recovery on L2 fails.

In an alternate example one PDCCH beam out of two PDCCH beams (or 2/3 or N/M) is considered OOS and there are other non-PDCCH beams in a cell available, L2 may indicate START (or cell level OOS) to RRC and initiates beam recovery or beam switch procedure to find a suitable PDCCH or switch to an existing PDCCH beam. In one example embodiment the UE may not be able to monitor all the PDCCH beams simultaneously, but may need to monitor different PDCCH beams in a time domain pattern, for example PDCCH beam #1 at time instance #1 and PDCCH beam #2 at time instance #2. Time instance may be a DL control symbol, time slot, subframe and so on.

In case all PDCCH beams are considered OOS and there are other non-PDCCH beams in a cell available, L2 may indicate START (or cell level OOS) to RRC and initiates beam recovery procedure to find a suitable PDCCH beam, as shown in FIG. 7 with reference numeral 404.

One aim of a beam recovery procedure by UE is to obtain new PDCCH beam configuration from network by signaling potential candidate beams. If alternative PDCCH beams exist, the recovery may be simply a beam switch: PDCCH reception is switched to alternative PDCCH beam (UE may be only able to receive PDCCH transmission from one beam at a time due to capability limitations i.e. UE may only form one RX beam at a time).

In case PDSCH beam(s) is/are down (i.e. at OOS) but at least one UL/DL PDCCH beams is still in-sync, then the UE may not need to inform L3, because the UE may transmit control signaling to network over control channel and in that way request/indicate new beams.

Upon beam recovery, such as for example a new PDCCH beam can be obtained via L1/L2 signaling or the quality of at least one of the existing PDCCH beams increases above the quality threshold, STOP command is indicated to the L3 (as shown in FIG. 7 with reference numeral 406) or IS indication when a PDCCH beam is considered to be IS.

Two implementation options for L2 to L3 IS/OOS indication are illustrated in the FIG. 7. L2 may indicate L3 START/STOP/EXPIRE timers (such as T310) directly or it may indicate cell level IS/OOS conditions to L3 which determines when to start/stop timers. L2 may still indicate EXPIRY to L3.

In case UE has not been configured with dedicated beam recovery resources (for example the UE can only use random access channel (RACH)) and all PDCCH beams are in OOS condition, START may be indicated (as shown in FIG. 7 with reference numeral 404)

L2 may determine that, when PDCCH beam/beams are not available (for example there have been N OOS indications received from the L1 layer, wherein N is a predetermined number, e.g. N310 of standard specifications) and there are no alternative beams that can be used for recovery, it may indicate EXPIRE to RRC (as shown with reference numeral 410 in FIG. 7).

There are many beam type examples. With features as described herein, the method and apparatus may act differently depending on which beams are in OOS.

Figure 8:
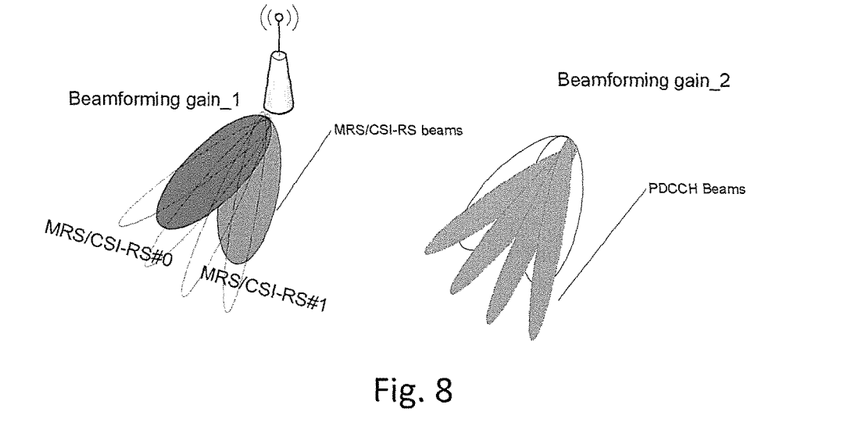
FIG. 8 is a diagram illustrating beamforming gain imbalance compensation.

Referring also to FIG. 8, in one additional example embodiment, the network may configure the UE to explicitly monitor specific beam(s) to determine DL or UL IS/OOS condition, although the same beam pattern is not used for PDCCH transmission. In such case a beamforming gain imbalance between the monitored beam (e.g. beam used to transmit MRS (mobility reference signals, used for L2/L3 mobility measurements) or CSI-RS (for mobility or explicitly configured for measurement)) and the PDCCH beams may be compensated by the gNB configuring an offset that indicates the beamforming gain difference between the PDCCH beam and the MRS/CSI-RS beam or a beam configured for radio link monitoring. For a beamforming gain imbalance between the monitored beam, the UE may utilize the beamforming gain difference to determine (hypothetical) PDCCH Block Error Rate (BLER). The UE may detect only MRS/CSI-RS beams for RLF and not the PDCCH beams, but can derive PDCCH beam's IS/OOS status/condition based on the indicated imbalance.

UL Portion Radio Link Monitoring Framework for a Beam Based System

Figure 9:
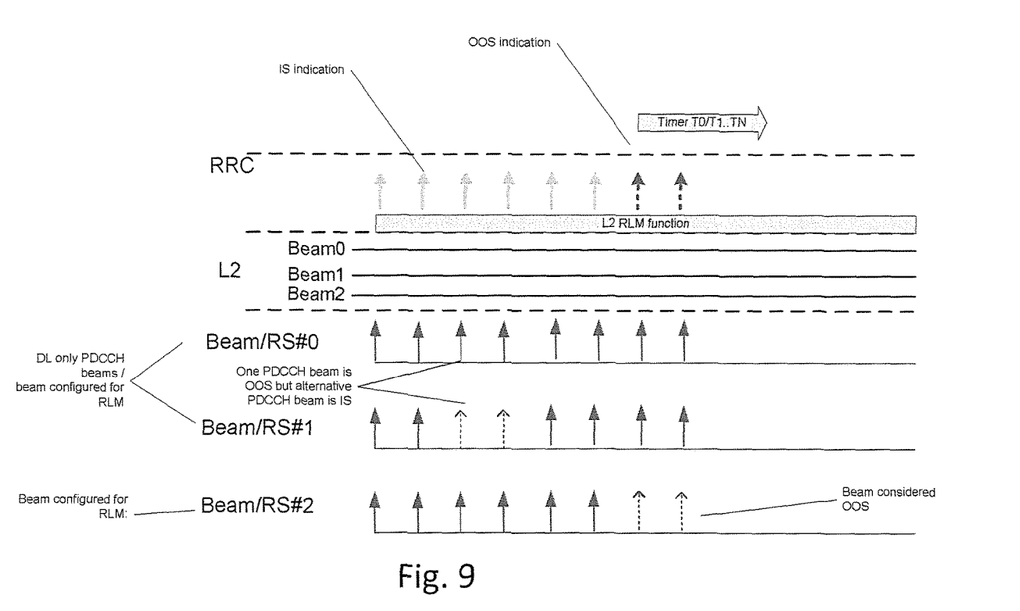
FIG. 9 is a diagram illustrating RLM framework considering UL beams.

Referring also to FIG. 9, in the case where the UE is configured to use a different UL beam, other than the configured PDCCH beams, the UL beam RLM may be based on the corresponding DL beam quality monitoring (noted as Beam #RS2 in the figure) and may be run on a separate counter. Instead of corresponding DL beam, beam #RS2 may be a DL/UL or UL beam. RLF on such a beam may alone trigger a timer start at L3. Furthermore the DL only and UL only radio link monitoring may be considered separately. As shown in FIG. 9, even if OOS condition is indicated from L1 for one of the two PDCCH beams 0 and 1, no start command needs to be sent to L3. However, when the beam2, representing the monitoring of UL beam is down (and the UE cannot communicate in uplink with other beams), OOS indications (or a start command) is sent to L3 to start a cell RLF timer. Then, L2 may start UL beam recovery, since the beam in link failure is an uplink beam in this example and these are considered separately.

L2 RLM function may determine START/STOP/EXPIRE or IS/OOS indications separately for the UL beam and DL. For example, when the PDCCH beams are above a quality threshold, but an uplink beam is below, L2 may indicate to a higher layer (e.g. RRC layer) a radio link problem and initiate beam recovery to re-establish UL. This radio link problem differs from a problem where all PDCCH beams are down (or specific number of PDCCH beams if multiple is configured). If UE has UL available but DL is down, it can potentially indicate using the working UL to the network. When UL is down may be detected by the network based on the DL only beams.

The UE may be configured with PDDCH beams that are not used for uplink and a PDCCH beam which is configured also for UL.

L2 RLM function may determine per beam the conditions to START/STOP/EXPIRE timer or IS/OOS condition taking into account when a beam is associated with PDCCH and UL, and when a beam is only for PDCCH For example, a beam associated with DL/UL (such as a beam which is associated with PDCCH and UL for example) may alone trigger indication of beam link problem (START timer) or OOS indication to a higher layer even though there are other PDCCH beams available (DL only beams). Also UL or DL/UL beam may cause early expire of a higher layer timer, such as T310 for example.

The base station, such as gNB for example, may also explicitly configure a DL beam that is used for determining UL IS/OOS condition as it has the knowledge of beam correspondence at gNB. In case of beam correspondence, the gNB may configure the DL beam corresponding to the configured UL beam for RLM.

In one example embodiment, the base station, such as gNB for example, may explicitly indicate to the UE how to perform the RLM in case the monitoring is done separately for DL only and UL only or DL/UL beams such as, for example, which beams to consider as "group" for IS/OOS condition. In a group wise RLM, detection of OOS indication for a member of the group has the effect that each beam in the group is considered to be in OOS condition.

Figure 10:
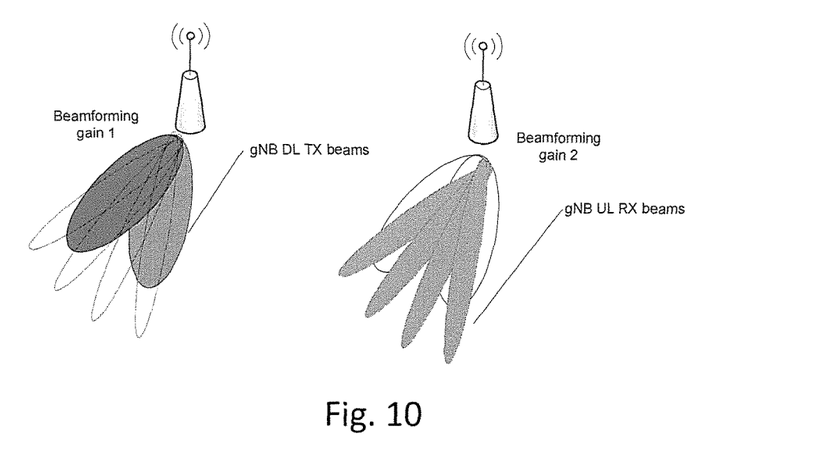
FIG. 10 is a diagram illustrating beamforming gain imbalance compensation for uplink.

Referring also to FIG. 10, there is shown an illustration of beam non-correspondence at a base station, such as gNB for example. The figure illustrates the beamforming gain difference between DL TX and UL RX beams. In one option, the gNB may not configure DL beam/reference signal to be used for UL RLM for a beam, in which case UL RLM is not handled by UE. In another option, the gNB configures DL beam for UL RLF monitoring and indicates to the UE a compensation parameter as the DL beam does not correspond directly with UL beam. As an example, the compensation parameter may be a beamforming gain offset between DL TX and UL RX beam, in which case the UE may utilize different quality thresholds, e.g. Qin/Qout thresholds, for determining IS/OOS to compensate the uncertainty between the beamforming gain imbalance. The compensation parameter may be a directly estimated beamforming gain imbalance of the maximum gain, or further compensated.

The quality thresholds Qin/Qout may correspond to the thresholds mentioned in the application and more specifically to a higher quality threshold and a lower quality threshold, respectively. These thresholds are used to define when to send IS and OOS, and may be defined in terms of 2% and 10% block-error-rate, BLER, for example. When monitoring/measuring the beam quality, a SINR metric may be used, for example. A metric may, in general, comprise radio link quality information. Responsive to the quality declining below the lower threshold, Qout, UE may begin generating out-of-sync indications at L1. In an example, an out-of-sync indication is generated every 200 milliseconds as long as the quality remains below threshold Qout. Once N310 out-of-sync indications have been received by L2, the RLF timer at RRC is started due to a START command by L2. If the quality increases over the higher threshold, Qin, before the RLF timer expires, in-sync indications are generated (e.g. every 100 ms as long as the radio link quality remains over Qin). However, to stop the RLF timer at RRC, N311 in-sync indications would be needed. If these are not received by L2 and indicated to L3 (or in the form of a STOP command) before the T310 timer expires, a RLF is determined at T310 timer expiry. The frequencies at which the out-of-sync and in-sync indications are generated may be configured by the network, for example. If N311 in-sync indications are received by L2 or RRC before the timer expires, the timer can be stopped and no RRC connection re-establishment process is needed. L2 may perform the counting in a case where it commands the RRC timer(s). Although two thresholds are used here in this example, only one quality threshold is a possible implementation option.

Figure 11:
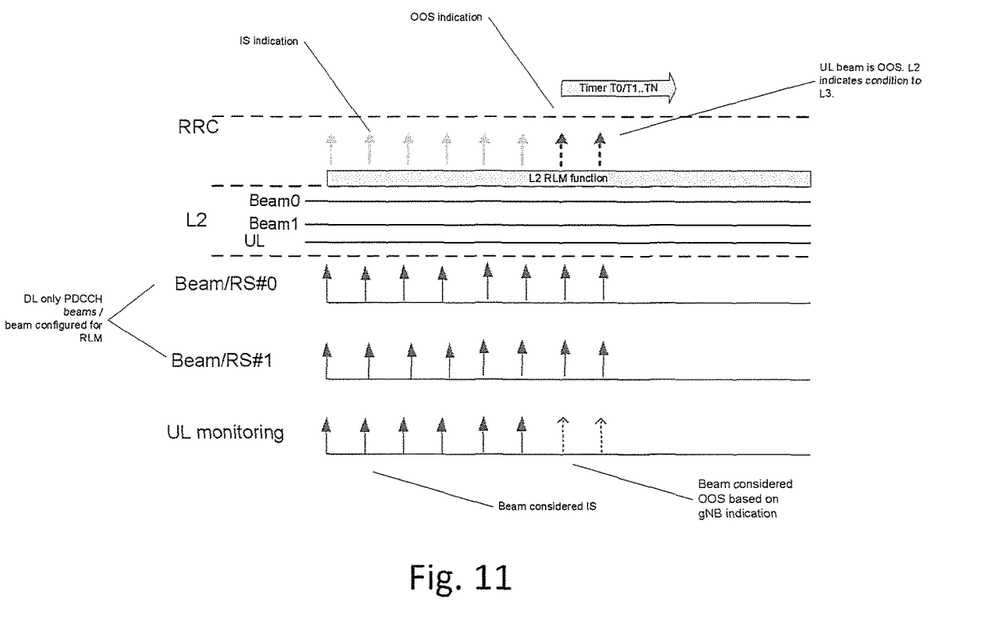
FIG. 11 is a diagram illustrating UL monitoring.

Referring also to FIG. 11, in a beam non-reciprocity case (where there is no correspondence of base station DL/UL beams) DL/PDCCH beams may be used to evaluate IS/OOS condition on downlink direction. The UL condition may be evaluated based on missing feedback signalling on DL. For example, N missing feedback transmissions on DL and/or N missing feedback for UL recovery SR transmission may trigger UL beam RLF indication to UE's RRC layer, as shown in FIG. 11, wherein number N is predefined or network signaled to the UE. This may cause L2 RLM function to consider UL beam to be in OOS and to indicate a radio link problem to a higher layer and initiate UL beam recovery separately from the DL condition. A "radio link problem" may occur before a radio link failure (RLF); when a radio link failure (RLF) has not yet been declared. Alternatively, in a case where the network configures the UE to monitor UL based on DL signal, the network may indicate a compensation offset to cover the beamforming gain imbalance.

Another example embodiment may comprise, in a case where L1/L2 receives beam recovery trigger on DL (downlink control information (DCI) and/or medium access control (MAC) control element (CE)) to indicate that UL is lost (or needs recovery), the L2 may trigger indication of a radio link problem to a higher layer and initiates a UL recovery procedure. The UE may have been configured to periodically (or aperiodically) transmit sounding reference signal (SRS) using UL beams. It may expect periodic feedback on the SRS transmission to determine UL quality (such as IS/OOS for example) or the network may trigger explicitly beam recovery for UL beams, for example by scheduling UE to transmit scheduling request (SR) or RACH.

In a beam non-reciprocity case, the base station may also feedback SRS measurement results to the UE that determines UL IS/OOS conditions based on the feedback. That is, the feedback may directly indicate to the UE whether the UL signal quality is good enough (such as above the quality threshold for example)

In one embodiment, one way to implement the quality monitoring may comprise the L1 indication being a beam specific L1 reference signal received power (RSRP) measurement provided to L2 that estimates the IS/OOS condition per beam and triggers RRC level timers (or indicates cell level IS/OOS to RRC) and/or beam recovery actions.

In another example embodiment, the IS/OOS condition may be based on missing feedback (ACK/NACK), missing detection of RS, failed decoding of MIB, PDCCH, PDCCH demodulation reference signal (DMRS), physical downlink shared channel (PDSCH) DMRS or the like. Also the IS/OOS condition may be based on a missing response to a recovery signal transmission.

Figure 12:
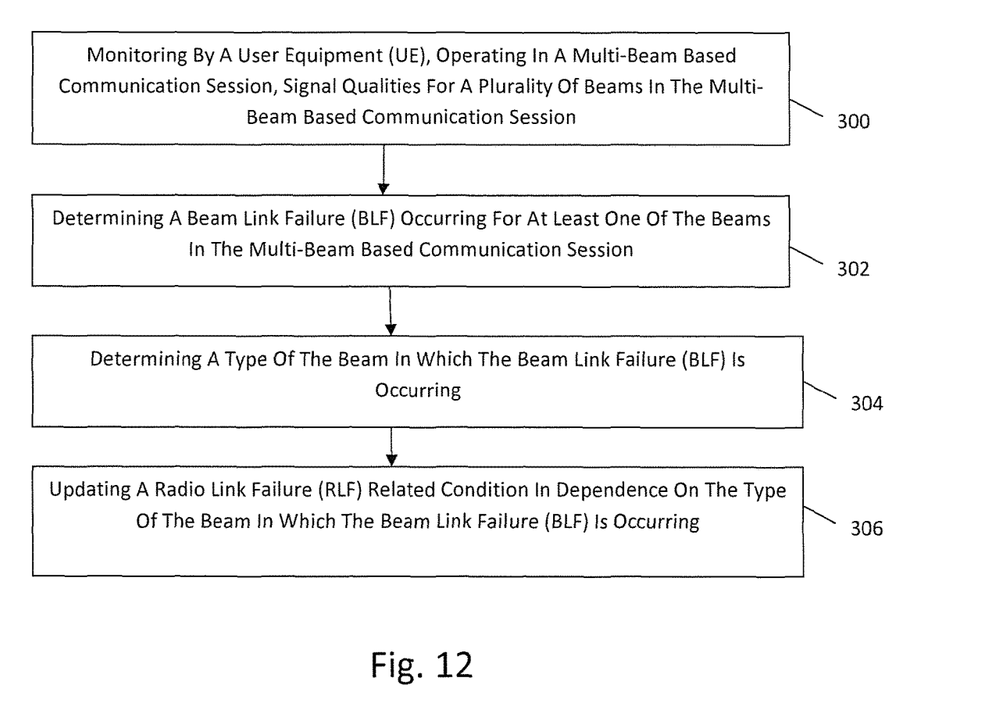
FIG. 12 is a diagram illustrating an example method.

Referring also to FIG. 12, an example method may comprise monitoring, by a user equipment (UE) operating in a multi-beam based communication session, signal qualities for a plurality of beams in the multi-beam based communication session as indicated by block 300; determining a beam link failure (BLF) occurring for at least one of the beams in the multi-beam based communication session as indicated by block 302; determining a type of the beam in which the beam link failure (BLF) is occurring as indicated by block 304; and updating a radio link failure (RLF) related condition in dependence on the type of the beam in which the beam link failure (BLF) is occurring as indicated by block 306.

The determining of the type of the beam may determine if the beam is one of a downlink (DL) beam, uplink (UL) beam, or a downlink/uplink (DL/UL) beam. The monitoring may be based on a beam-specific in-sync indication and/or out-of-sync indication of the signal quality of the beam. The method may further comprise employing, at a layer below a radio resource control (RRC) layer, a plurality of beam-specific counters for monitoring the signal qualities for the plurality of beams; and upon at least one of the plurality of beam-specific counters meeting a predetermined condition with respect to the signal quality of the beam, sending a command to the RRC layer, wherein the command instructs the RRC layer to update the radio link failure (RLF) related condition. A plurality of counters may be employed separately for each beam. The updating of the RLF related condition may include one of starting at least one timer, stopping the at least one timer and expiring the at least one timer immediately, wherein the at least one timer is employed at a radio resource control (RRC) layer. The method may further comprise starting the at least one timer when directly instructed by L2 or when L2 has indicated a predetermined number out of sync condition. The method may further comprise stopping the at least one timer when directly instructed by L2 or when L2 has indicated a configured number of in-sync condition. The method may further comprise expiring the at least one timer when directly indicated by L2. The signal quality of an uplink beam may be based on at least one of the following: receiving an indication from a network regarding the signal quality of the uplink beam, and detection of a lack of uplink related feedback signaling on downlink. The method may further comprise receiving an indication of a gain offset between uplink and downlink beams; and monitoring the signal quality of the uplink beam based on the signal quality of the downlink beam and the gain offset.

An example embodiment may be provided in a computer program product, such as 216 shown in FIG. 1A for example, comprising program instructions which, when loaded into an apparatus, execute the steps of the methods described above.

An example apparatus may be provided comprising at least one processor; and at least one non-transitory memory including computer program code, the at least one memory and the computer program code configured to, with the at least one processor, cause the apparatus to: monitor by the apparatus, operating in a multi-beam based communication session, signal qualities for a plurality of beams in the multi-beam based communication session; determine a beam link failure (BLF) occurring for at least one of the beams in the multi-beam based communication session; determine a type of the beam in which the beam link failure (BLF) is occurring; and update a radio link failure (RLF) related condition in dependence on the type of the beam in which the beam link failure (BLF) is occurring.

The apparatus may be configured to determine if the beam is one of at least a downlink (DL) beam or an downlink/uplink (DL/UL) beam or an uplink (UL) beam. The apparatus may be configured to monitor based on a beam-specific in-sync indication and/or out-of-sync indication of the signal quality of the beam. The apparatus may be further configured to: employ, at a layer below a radio resource control (RRC) layer, a plurality of beam-specific counters, for monitoring the signal qualities for the plurality of beams, which are configured, upon at least one of the plurality of beam-specific counters meeting a predetermined condition with respect to the signal quality of the beam, sending a command to the RRC layer, wherein the command is configured to instruct the RRC layer to update the radio link failure (RLF) related condition. The apparatus may be configured to employ a plurality of counters for each beam. The apparatus may be configured to update the RLF related condition comprising one of starting at least one timer, stopping the at least one timer and expiring the at least one timer immediately, wherein the at least one timer is employed at a radio resource control (RRC) layer. The apparatus may be configured to perform at least one of: start the at least one timer when directly instructed by L2 or when L2 has indicated a predetermined number out of sync condition; stop the at least one timer when directly instructed by L2 or when L2 has indicated a configured number of in-sync condition; and expire the at least one timer when directly indicated by L2. The apparatus may be configured such that the signal quality of an uplink beam is based on at least one of the following: receiving an indication from a network regarding the signal quality of the uplink beam, and detection of a lack of uplink related feedback signaling on downlink. The apparatus may be configured to: receive an indication of a gain offset between uplink and downlink beams; and monitor the signal quality of the uplink beam based on the signal quality of the downlink beam and the gain offset. The apparatus may comprising means for performing the steps in the methods described above.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example embodiment may be provided in an apparatus comprising means for monitoring, by a user equipment (UE) operating in a multi-beam based communication session, a signal quality for a respective beam in the multi-beam based communication session; means for determining a radio link failure (RLF) occurring for the beam in the multi-beam based communication session; means for determining a type of the beam in which the radio link failure (RLF) is occurring; and means for updating a radio link failure (RLF) related radio resource control (RRC) timer condition in dependence on the type of the beam in which the radio link failure (RLF) is occurring.

With features as described herein, beam-specific RLF counting for beams may be configured for PDCCH reception so that each beam tracks the RLF separately at L2, and the UE can indicate to UE's upper layers potential beam failure on a given configured resources, such as a cell or a beam group for example. Upon receiving the indication from L2, the RRC may determine whether to declare cell-level RLF depending on the nature of the indication. Each beam may have its specific counters at L2 (a layer below RRC). The RRC timers may be affected by the L2 directly with START/STOP/EXPIRE commands (that start/stop/expire the timer at RRC) based on beam level counters.

In one example embodiment, the IS/OSS condition is calculated per beam for beams configured for PDCCH reception. In case there is at least one PDCCH beam in IS condition, L2 does not indicate RRC level RLF timer start. In case there are no PDCCH beams in IS condition, and there are other beams in a cell available, L2 may indicate START to RRC and initiates beam recovery.

In some embodiments, beams may be handled differently based on whether the beam is a DL only beam or DL+UL beam. For example, losing one DL only PDCCH beam is not as severe as losing DL/UL beams which may affect the RRC T310 timer condition.

For UL beams, UL beam RLM may be based on the corresponding DL beam quality monitoring and may be run on a separate counter. L2 RLM function may determine START/STOP/EXPIRE indications separately for the UL beam and DL. In a case of non-reciprocity, the base station may indicate to the UE to do UL beam recovery in the case where the base station does not receive any UL from the UE.

With features as described herein, PDCCH beams may be targeted for monitoring. With features as described herein, L2 may have beam specific counters, which may instruct the RRC layer (START/STOP/EXPIRE) in regard to a counter, such as the T310 counter at RRC for example. With features as described herein, UL beams and DL beams may have separate handling. This may include different beam handling depending on whether the beam is UL beam or UL/DL beam. With features as described herein, the timer handling at RRC layer may be dependent, at least partially, on which kind of beam(s), such as UL or DL, or UL/DL for example, suffer from a RLF at the lower layer.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. An apparatus comprising:
   at least one processor; and
   at least one non-transitory memory including computer program code, the at least one memory and the computer program code configured to, with the at least one processor, cause an apparatus operating in a multi-beam based communication session at least to:
   monitor signal qualities for a plurality of beams in the multi-beam based communication session, wherein the monitoring is based on monitoring beams carrying physical downlink control channels;
   determine a beam link failure (BLF) occurring for at least one of the beams;
   detect whether or not a BLF occurs for all of the beams of a predetermined type, wherein the predetermined type of beams comprise only beams carrying physical downlink control channels; and
   in response to detecting that a BLF occurs for all of the beams of the predetermined type, decide to provide an indication of the BLF to a higher layer; and
   in response to detecting that there is at least one other beam of the predetermined type without a BLF, decide not to provide an indication of the BLF to the higher layer.

2. The apparatus of claim 1, wherein the indication is provided from layer 1 to layer 2.

3. The apparatus of claim 1, wherein the monitoring is based on a beam-specific in-sync indication and/or out-of-sync indication of the signal quality of the beam.

4. The apparatus of claim 1, wherein the at least one memory and the computer program code configured to, with the at least one processor, cause the apparatus further to:
   determine that the type of the beam in which the BLF is occurring belongs to the predetermined type of beams.

5. The apparatus of claim 1, wherein the at least one memory and the computer program code configured to, with the at least one processor, cause the apparatus further to:

determine that the type of the beam in which the BLF is occurring belongs to the predetermined type of beams, wherein the predetermined type of beams comprise only downlink beams.

6. The apparatus of claim 1, wherein the at least one memory and the computer program code configured to, with the at least one processor, cause the apparatus further to:
upon deciding to provide the indication of the BLF to higher layers, update a radio link failure (RLF) related condition, wherein the RLF related condition includes one of starting at least one timer, stopping the at least one timer and expiring the at least one timer, wherein the at least one timer is employed at a radio resource control layer.

7. The apparatus of claim 6, wherein the at least one memory and the computer program code configured to, with the at least one processor, cause the apparatus further at least to:
start-the at least one timer when directly instructed by layer 2 (L2) or when L2 has indicated a predetermined number out of sync conditions; and/or
stop the at least one timer when directly instructed by L2 or when L2 has indicated a predetermined number of in-sync conditions.

8. The apparatus of claim 6, wherein the at least one memory and the computer program code configured to, with the at least one processor, cause the apparatus further at least-to:
expire the at least one timer when all downlink beams providing physical downlink control channel to the apparatus are determined to be in a BLF.

9. The apparatus of claim 1, wherein the signal quality of an uplink beam is based on at least one of the following: reception of an indication from a network regarding the signal quality of the uplink beam, and detection of a lack of uplink beam related feedback signaling on downlink.

10. The apparatus of claim 1, wherein the at least one memory and the computer program code configured to, with the at least one processor, cause the apparatus further to:
receive an indication of a gain offset between uplink and downlink beams; and
monitor the signal quality of the uplink beam based on the signal quality of the downlink beam and the gain offset.

11. A method, comprising:
monitoring, at a user equipment (UE) operating in a multi-beam based communication session, signal qualities for a plurality of beams in the multi-beam based communication session, wherein the monitoring is based on monitoring beams carrying physical downlink control channels;
determining a beam link failure (BLF) occurring for at least one of the beams;
detecting whether or not a BLF occurs for all of the beams of a predetermined type, wherein the predetermined type of beams comprise only beams carrying physical downlink control channels; and
in response to detecting that a BLF occurs for all of the beams of the predetermined type, deciding to provide an indication of the BLF to a higher layer; and
in response to detecting that there is at least one other beam of the predetermined type without a BLF, deciding not to provide an indication of the BLF to the higher layer.

12. The method of claim 11, wherein the indication is provided from layer 1 to layer 2.

13. The method of claim 11, wherein the monitoring is based on a beam-specific in-sync indication and/or out-of-sync indication of the signal quality of the beam.

14. The method of claim 11, further comprising:
determining that the type of the beam in which the BLF is occurring belongs to the predetermined type of beams.

15. The method of claim 11, further comprising:
upon deciding to provide the indication of the BLF to higher layers, updating a radio link failure (RLF) related condition, wherein the RLF related condition includes one of starting at least one timer, stopping the at least one timer and expiring the at least one timer, wherein the at least one timer is employed at a radio resource control layer.

16. The method of claim 15, further comprising:
starting the at least one timer when directly instructed by layer 2 (L2) or when L2 has indicated a predetermined number out of sync conditions; and/or
stopping the at least one timer when directly instructed by L2 or when L2 has indicated a predetermined number of in-sync conditions; and/or
expiring the at least one timer when all downlink beams providing physical downlink control channel to the apparatus are determined to be in a BLF.

17. The method of claim 11, wherein the signal quality of an uplink beam is based on at least one of the following:
reception of an indication from a network regarding the signal quality of the uplink beam;
detection of a lack of uplink beam related feedback signaling on downlink; or
reception of an indication of a gain offset between uplink and downlink beams and monitoring of the signal quality of the uplink beam based on the signal quality of the downlink beam and the gain offset.

18. An apparatus comprising:
at least one processor; and
at least one non-transitory memory including computer program code, the at least one memory and the computer program code configured to, with the at least one processor, cause the apparatus operating in a multi-beam based communication session at least to:
monitor signal qualities for a plurality of beams in the multi-beam based communication session, wherein the monitoring is based on monitoring physical downlink control channels;
determine a beam link failure (BLF) occurring for at least one of the beams;
detect whether or not a BLF occurs for all of the beams of a predetermined type, wherein the predetermined type of beams comprise only uplink beams; and
in response to detecting that a BLF occurs for all of the beams of the predetermined type, decide to provide an indication of the BLF to a higher layer; and
in response to detecting that there is at least one other beam of the predetermined type without a BLF, decide not to provide an indication of the BLF to the higher layer.

\* \* \* \* \*

UNITED STATES PATENT AND TRADEMARK OFFICE
CERTIFICATE OF CORRECTION

PATENT NO. : 10,972,152 B2
APPLICATION NO. : 16/496024
DATED : April 6, 2021
INVENTOR(S) : Koskela et al.

Page 1 of 1

It is certified that error appears in the above-identified patent and that said Letters Patent is hereby corrected as shown below:

In the Claims

In Column 17, Line 18, Claim 7, delete "start-the" and insert -- start the --, therefor.

In Column 17, Line 27, Claim 8, delete "least-to" and insert -- least to --, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*